UNITED STATES PATENT OFFICE.

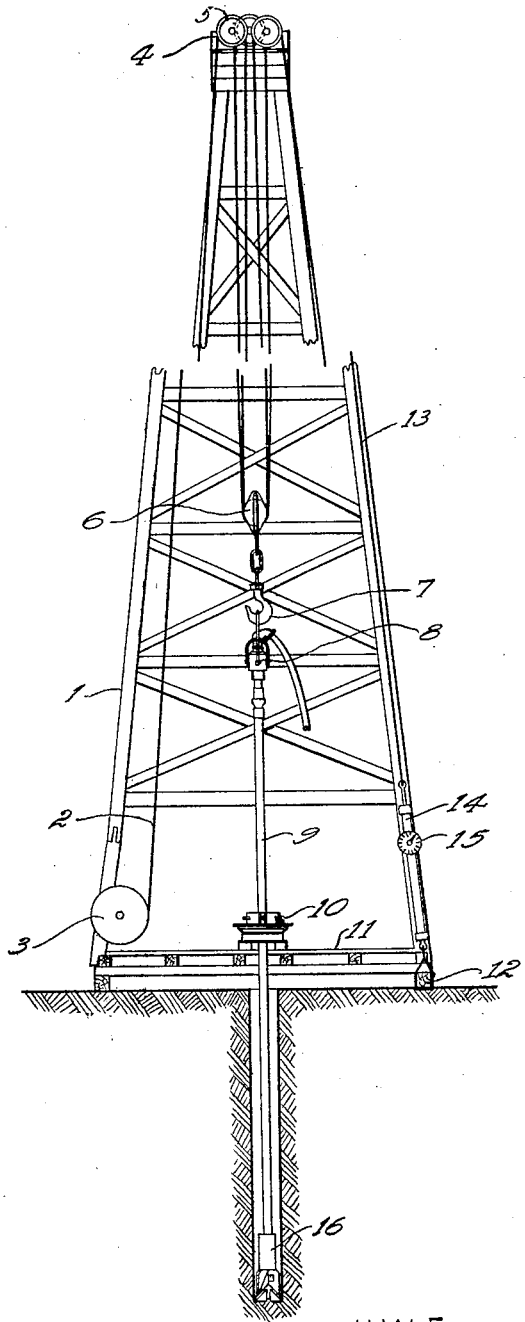

HAROLD W. FLETCHER, OF HOUSTON, TEXAS.

LOAD-INDICATOR.

1,323,037.     Specification of Letters Patent.     Patented Nov. 25, 1919.

Application filed January 30, 1919. Serial No. 274,118.

*To all whom it may concern:*

Be it known that I, HAROLD W. FLETCHER, a citizen of the United States, residing at Houston, Harris county, Texas, have invented a certain new and useful Improvement in Load-Indicators, of which the following is a full, clear, and exact description, such as will enable others skilled in the art to which it appertains to make and use the same.

My invention relates to improvements in means for measuring the load resting upon a rotary bit or other tool operating in a well.

In the drilling of wells, especially oil or gas wells, where the successful operation of the drill depends largely upon the proper adjustment of the weight upon the drill, it is necessary to have some accurate means for measuring the weight resting upon the tool. This is especially so where the tool is operating in deep wells. The difficulty in deep well drilling is usually that the weight of the drill stem becomes so great that the full weight thereof cannot be successfully borne by the drill in operation without detrimental effect thereto.

One object of my invention is to so position a load indicator upon the drilling apparatus that the said indicator will accurately measure the weight which is borne by the drill. By this means a driller will be able to determine at all times exactly what weight is resting upon the drill and will hence be able to adjust the same with accuracy, so that the weight shall at no time be excessive.

Another object is to provide a means of using an indicator so that the said indicator shall be easily accessible for inspection at all times and whereby the indicator may be readily attached to or detached from any ordinary drilling apparatus now in use in well drilling.

Referring to the drawing forming a part of this specification, the figure discloses, in more or less diagrammatical form, my invention as applied to the apparatus now ordinarily in use in well drilling.

My device is used in connection with the ordinary derrick represented at 1. The cable 2 used to support the drill in the well, passes over the hoisting drum 3 and upwardly to the crown block 4 at the top of the derrick, passing over one of the sheaves 5 and downwardly around one of the blocks or sheaves in the traveling block 6 then backwardly over another one of the sheaves in the crown block and again around one of the sheaves in the traveling block and back to the crown block. The outer end of the cable indicated at 13 is called the dead line and is sometimes fastened to the upper end of the traveling block, but in the use of my improved method of load indicating this cable is carried downwardly and attached to the weight indicator, said indicator being in turn attached to the mud sill 12. The drill stem 9 and the drill 16 within the hole are supported from the traveling block in the usual manner, there being a hook 7 attached to the traveling block, the said hook passing through a bail attached to the swivel 8. Upon the swivel 8 is supported the drill stem 9 which is free to rotate within the swivel, the rotation being caused by the usual rotary 10 seated upon the derrick platform 11.

In order to indicate the load resting upon the drill 16 at the bottom of the well, I contemplate attaching an indicator which may be of any ordinary construction at the end of the dead line and between the same and the mud sill of the derrick. This indicator is designated by the numeral 14 in the drawing and represents diagrammatically an ordinary type of spring scale. The tension upon the spring is communicated to a hand moving on a dial 15, said dial being calibrated to indicate indirectly the weight resting upon the bit. The weight actually pulling upon the indicator 14 will be, in the construction shown in the drawing, only $\frac{1}{4}$ of the weight actually resting upon the bit. This will be obvious by noting the arrangement of the cable. The number of lines of cable connecting the traveling block and the weight supported thereby with the sheaves of the crown block will be four in number, each one of them supporting $\frac{1}{4}$ of the weight and the loose end of the cable constituting the dead line, will thereby have a tension thereon equal to one-fourth of the weight upon the traveling block. It is obvious that more than four loops could be made in the cable passing around a traveling block having more than two sheaves therein and in such case the weight upon the dead line would be proportionately less. This could easily be taken into account in calibrating the reading upon the dial.

In the use of my device it will be obvious that the dial will be in a position easily to be read by the driller as he stands on the platform. The drill and drill stem will be lowered by the hoisting drum gradually into the well and the weight appearing upon the dial will indicate the full weight of the same. As the bit gradually rests upon the bottom of the well, the load will be taken off of the dead line and the indicator will note the loss of the weight which has previously been borne by the cable and it will be easily seen that the lowering of the bit may be stopped at such a point that the correct weight desired will be borne by the bit, the rest of the weight of the drill stem and drill being taken up by the cable itself.

I have described my invention as being used especially in operation of drilling, but it is applicable for other purposes, as will be obvious. It fills a valuable purpose in the operation of withdrawing pipe in fishing operations wherein it is often impossible, without an indicator, to tell when the pipe to be withdrawn from the well, has been caught by the fishing tool. By the use of my indicator, however, in the manner set forth, it will be easily possible to determine whether any extra load has been taken up by the fishing tool. I do not desire, therefore, to limit myself to the particular operation of drilling in the use of my improved method, but desire protection on any of the ordinary and obvious uses to which the same may be put.

This method of using an indicator is thought to be entirely new and is thought to be especially useful for the purpose for which it was devised. The applicant claims to be the first to attach the indicator at the end of the dead line and in such position that it will indicate exactly at all times the weight resting upon the bit and in which only a part of the actual weight of the drill or other tool is borne by the indicator itself.

Having thus described my invention, what I claim as new and desire to protect by Letters Patent, is:

1. An apparatus of the character described comprising, a hoisting drum, a derrick, a crown block thereon, a traveling block adapted for attachment to a load, a cable on said drum and running around said traveling block and crown block, and a spring load indicator secured to the said derrick, the forward end of said cable being attached to said indicator so that a part only of the weight of the load on the traveling block is sustained by said indicator.

2. In an apparatus for well drilling comprising a derrick, a hoisting drum, a crown block at the top of the derrick, a traveling block to which the drill and drill stem are suspended, a cable running from said drum over said crown block, around the traveling block, and having the dead line connected to the derrick platform; the method of regulating the load resting upon said drill sustained by said cable consisting of sustaining the load and the drill bit on the traveling block, securing a load indicator in the dead line anchored to the derrick, noting the total weight of drill stem and drill indicated as sustained by the traveling block, gradually lowering the bit to the bottom of the well, noting the weight released as the drill gradually rests on the bottom of the hole and anchoring the traveling block when the desired weight is released.

In testimony whereof, I hereunto affix my signature this the 25th day of January, A. D. 1919.

HAROLD W. FLETCHER.